United States Patent
Cervantes

(10) Patent No.: US 6,867,794 B2
(45) Date of Patent: Mar. 15, 2005

(54) ADJUSTING A SCAN LINE IN A LASER IMAGING DEVICE

(75) Inventor: Jose L. Cervantes, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 31 days.

(21) Appl. No.: 10/355,861

(22) Filed: Jan. 30, 2003

(65) Prior Publication Data

US 2004/0150708 A1 Aug. 5, 2004

(51) Int. Cl.[7] .............................. B41J 2/435; B41J 2/47
(52) U.S. Cl. ..................................... 347/235; 347/250
(58) Field of Search ............................... 347/234, 235, 347/248, 249, 250, 255

(56) References Cited

U.S. PATENT DOCUMENTS

| | | | |
|---|---|---|---|
| 4,474,422 A | 10/1984 | Kitamura | 514/400 |
| 4,852,957 A | 8/1989 | Wakimoto et al. | 359/208 |
| 5,193,008 A | 3/1993 | Frazier et al. | 358/1.2 |
| 5,666,447 A | 9/1997 | Chuang et al. | 385/31 |
| 5,691,759 A | 11/1997 | Hanson | 347/233 |
| 5,760,817 A | 6/1998 | Foote et al. | 347/248 |
| 5,818,504 A | 10/1998 | Chung et al. | 347/251 |
| 6,037,962 A | 3/2000 | Hanson et al. | 347/233 |
| 6,057,867 A | 5/2000 | Chan et al. | 347/134 |
| 6,134,041 A | 10/2000 | Hong et al. | 359/216 |
| 6,219,085 B1 * | 4/2001 | Hanna | 347/249 |
| 6,259,467 B1 * | 7/2001 | Hanna | 347/249 |

* cited by examiner

Primary Examiner—Hai Pham

(57) ABSTRACT

A laser imaging device is described. The laser imaging device includes a first laser, a second laser, and a controller. The first laser provides a first scan line having a first starting point, and the second laser provides a second scan line having a second starting point based on an adjusted beam detect signal. The controller is configured to generate the adjusted beam detect signal using a delay code and a beam detect signal associated with the second laser to substantially horizontally align the second starting point with the first starting point.

37 Claims, 5 Drawing Sheets

ADJUSTING A SCAN LINE IN A LASER IMAGING DEVICE

BACKGROUND

Laser imaging devices, including laser printers and copiers, are used in a wide variety of computer systems. Efforts are continually being made to increase the printing/copying speed of such devices, while at the same time maintaining quality and reducing their cost. Laser printers are designed to produce an image on paper or other print material by placing overlapping dots at virtual positions defined by a digital raster. These virtual positions in the raster are known as "pixels", which is short for "picture elements". In laser printers, the image is typically first produced on a charged photoconductive material by scanning the photoconductor with a laser beam in a sequence of scan lines. A laser printer may scan the surface of the photoconductive material with a laser in the sequence of scan lines using a rotating polygonal mirror. As a line is scanned, or written, the laser beam is energized during the extent of each pixel that corresponds to a dot in the image. When the laser beam is energized, the portion of the photoconductor upon which the laser energy impinges is discharged, thereby producing a charge-pattern copy of the desired image on the photoconductor. The printed output is obtained by attracting toner to the charge-pattern and transferring the developed image to paper or other print material.

In order to increase the operating speed of such a laser imaging device, laser printers may use multiple laser beams to concurrently scan multiple scan lines that are vertically offset from one another by an incremental amount. Such imaging devices may be referred to as multiple-beam engines. By concurrently scanning multiple laser beams, the time required to scan the photoconductive material is decreased, which results in an increased exposure and print speed. However, for a multiple beam laser printer, good horizontal alignment of the scan lines produced by the individual lasers can help to produce a high quality image. Unfortunately, due to slight variations in mechanical tolerances of the laser units, photoconductor, and the length of video paths of printed circuit boards, there is almost inherently a slight horizontal mis-alignment between scan lines. For example, in a laser printer where the lasers scan from left to right across the photoconductive material, one laser may begin to write pixel data at a first point, while a second laser may begin to write pixel data at a second point that is to the left of the first point. The result is that the scan lines are not horizontally aligned and image quality is reduced. Misalignment can cause a variety of print artifacts, such as lines that do not appear straight.

SUMMARY OF THE INVENTION

One aspect of the present invention provides a laser imaging device. The laser imaging device includes a first laser, a second laser, and a controller. The first laser provides a first scan line having a first starting point, and the second laser provides a second scan line having a second starting point based on an adjusted beam detect signal. The controller is configured to generate the adjusted beam detect signal using a delay code and a beam detect signal associated with the second laser to substantially horizontally align the second starting point with the first starting point.

BRIEF DESCRIPTION OF THE DRAWINGS

Embodiments of the invention are better understood with reference to the following drawings. The elements of the drawings are not necessarily to scale relative to each other. Like reference numerals designate corresponding similar parts.

DESCRIPTION OF THE PREFERRED EMBODIMENTS

Figure 1:
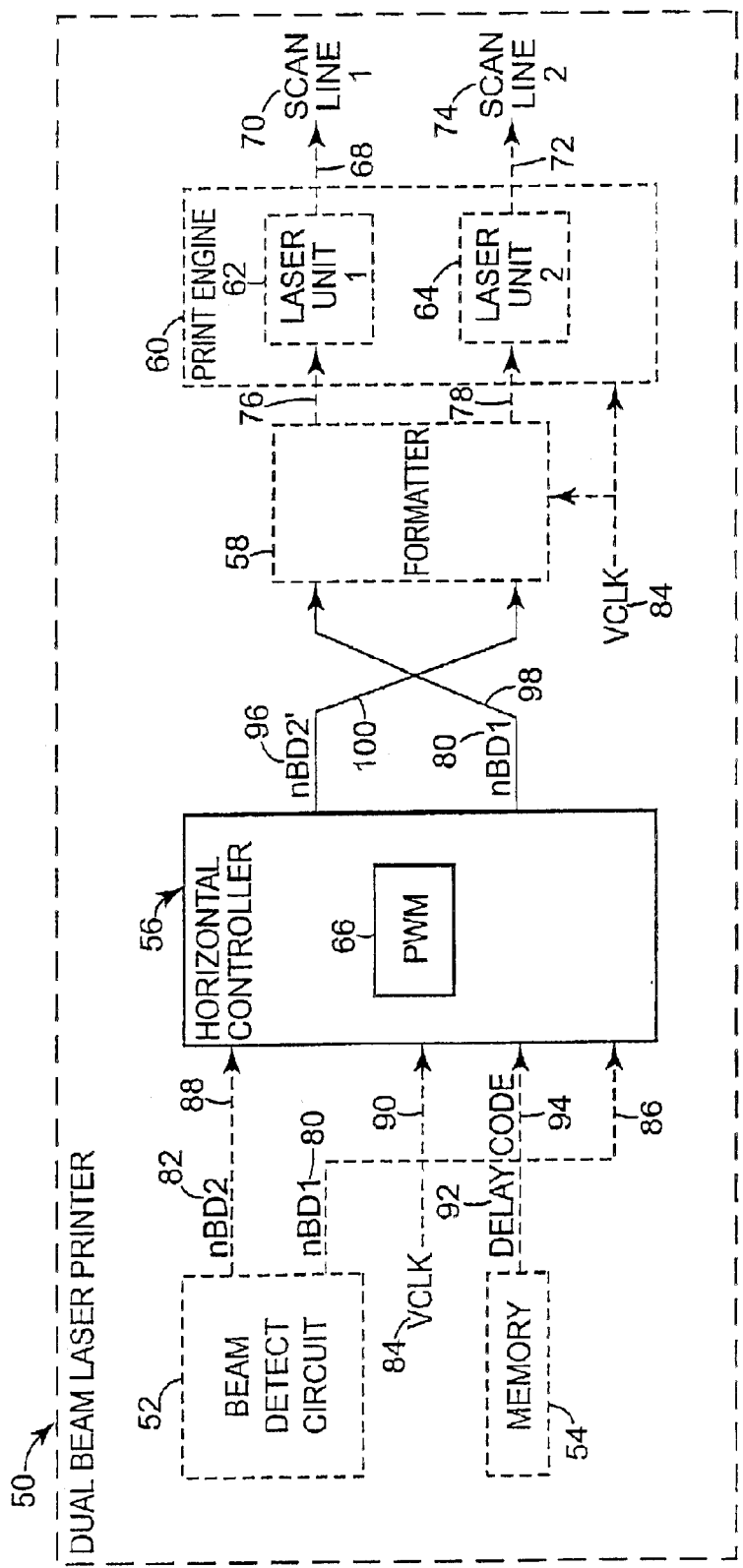
FIG. 1 is a block diagram of an exemplary embodiment of a dual-beam laser printer.

FIG. 1 illustrates one exemplary embodiment of a dual-beam laser printer 50. Laser printer 50 includes a beam detect circuit 52, a memory 54, a horizontal controller 56, a formatter 58, and a print engine 60. Print engine 60 further includes a first laser unit 62 and a second laser unit 64, and horizontal controller 56 further includes a pulse width modulator (PWM) 66. In the example embodiment of FIG. 1, laser printer 50 is illustrated as a dual-beam laser printer capable of concurrently scanning two laser beams. The principles described below can, however, apply to laser scanning devices concurrently scanning more than two laser beams.

Dual-beam laser printer 50 is configured to concurrently scan a first laser beam 68 provided by first laser unit 62 along a first scan line 70, and a second laser beam 72 provided by second laser unit 64 along a second scan line 74, wherein scan lines 70 and 74 are vertically separated by an incremental amount. Laser units 62 and 64 of print engine 60 receive pixel data streams representative of an image from formatter 58 via paths 76 and 78, respectively, and convert the data streams into laser beams 68 and 72 to effect the transfer of the image to a print medium.

Beam detect circuit 52 detects the presence of first laser beam 68 and second laser beam 72 once per scan line during a scanning operation, and provides a first beam detect signal (nBD1) 80 and a second beam detect signal (nBD2) 82 which are indicative of the beginning of first scan line 70 and second scan line 74, respectively. Ideally, formatter 58 would receive first and second beam detect signals 80 and 82 directly from beam detect circuit 52 and wait a fixed number of clock cycles of a video clock signal 84 and then begin transferring pixel data to laser units 62 and 64 for writing to a print material. By waiting the fixed number of delays after receiving the beam detect signals nBD1 80 and nBD2 82, formatter 48 attempts to ensure that first and second scan lines 70 and 72 begin at a desired location on the print material. However, due to deviations between laser units 62 and 64 and other printer components caused by manufacturing tolerances, such an approach would result in laser units 62 and 64 producing first and second scan lines 70 and 74 that are not vertically aligned and consequently provide poor image quality.

In order to provide substantial vertical alignment between first and second scan lines 72 and 74, dual-beam laser printer 50, first provides nBD1 80 and nBD2 82 to horizontal controller 56 via paths 86 and 88, respectively. Horizontal controller 56 also receives video clock signal 84 via a path 90 and a delay code 92 from memory 54 via path 94. PWM 66 converts delay code 92 into a desired delay which is inserted by horizontal controller 56 into second beam detect signal 82 to provide adjusted second beam detect signal (nBD2') 96. Horizontal controller 56 provides nBD1 80 and nBD2' 96 to formatter 58 via paths 98 and 100, respectively. After receiving nDB1 80 and nBD2', formatter 58 waits for the fixed number of cycles of VCLK 84 and begins conveying pixel stream data via paths 76 and 78 respectively to first and second laser units 62 and 64 for transferring an image to print material. By utilizing nBD2' to determine the starting location of scan line 74 rather than non-adjusted beam detect signal nBD2 provided by beam detect circuit 52, first and second scan lines 70 and 74 are substantially aligned vertically.

Delay code 92 for dual-beam laser printer 50 is a value that may be determined at manufacture. After assembly, test pair of first and second scan lines 70 and 74 are produced without a delay being added to second beam detect signal 82. In other words, nBD2' 96 is not adjusted and is substantially equal to non-adjusted second beam detect signal nBD2 82. A horizontal offset error between vertically offset scan lines 70 and 74 is measured and the offset error is converted to a desired time delay required for the scan lines to align vertically. The desired time delay is converted to a delay code that is provided to PWM 66. The delay code is simply a pulse code instructing PWM 66 to provide a series of output pulses with each pulse having a duration substantially equivalent to the desired delay. Horizontal controller 56 combines the output pulses of PWM 66 with second beam detect signal nBD2 82 to provide adjusted second beam detect signal nBD2'.

Figure 2A:
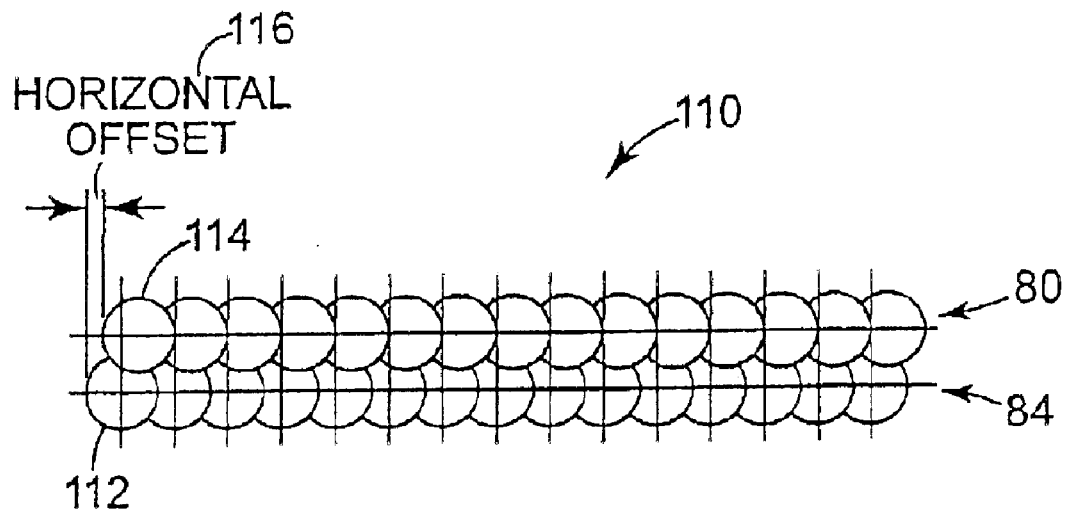
FIG. 2A is an illustrative diagram of horizontally mis-aligned scan lines provided by a dual-beam laser printer.

FIG. 2A is an illustrative diagram of a printed output 110 of dual-beam laser printer 50 when second beam detect signal 82 is not adjusted and second scan line 74 is misaligned with first scan line 70. Scan lines 70 and 74 each comprise a series of dots, with a first dot 112 of scan line 74 being to the left of a first dot 114 of scan line 70. Horizontal offset 116 indicates a distance by which second scan line 74 is horizontally is misaligned with first scan line 70.

Figure 2B:
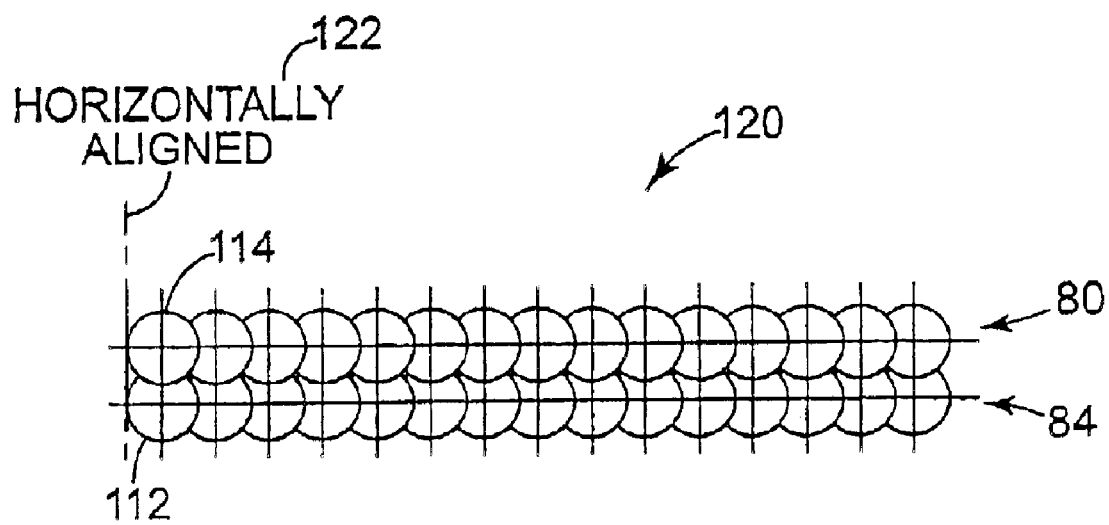
FIG. 2B is an illustrative diagram of scan lines aligned horizontally by a dual-beam laser printer

FIG. 2B is an illustrative diagram of a printed output 120 of dual-beam laser printer 50 when nBD2 82 is adjusted to provide nBD2' to thereby substantially horizontally align second scan line 74 with first scan line 70, as indicated at 122. Horizontal offset distance 116 may be measured during manufacture of laser printer 50 and translated to a delay code, such as delay code 92, with the delay code being stored in a memory, such as memory 54. PWM 66 receives delay code 92 and provides at least one output pulse have a width substantially equal to horizontal offset 116. Horizontal controller 56 adds the at least one output pulse to second beam detect signal nBD2 to provide adjusted second beam detect signal nBD2'. Formatter 58 receives adjusted second beam detect signal nBD2' which delays second laser unit 64 beginning to output pixel data via second laser beam 72 and thereby shifts the first dot 112 of second scan line 84 to the right.

Figure 3:
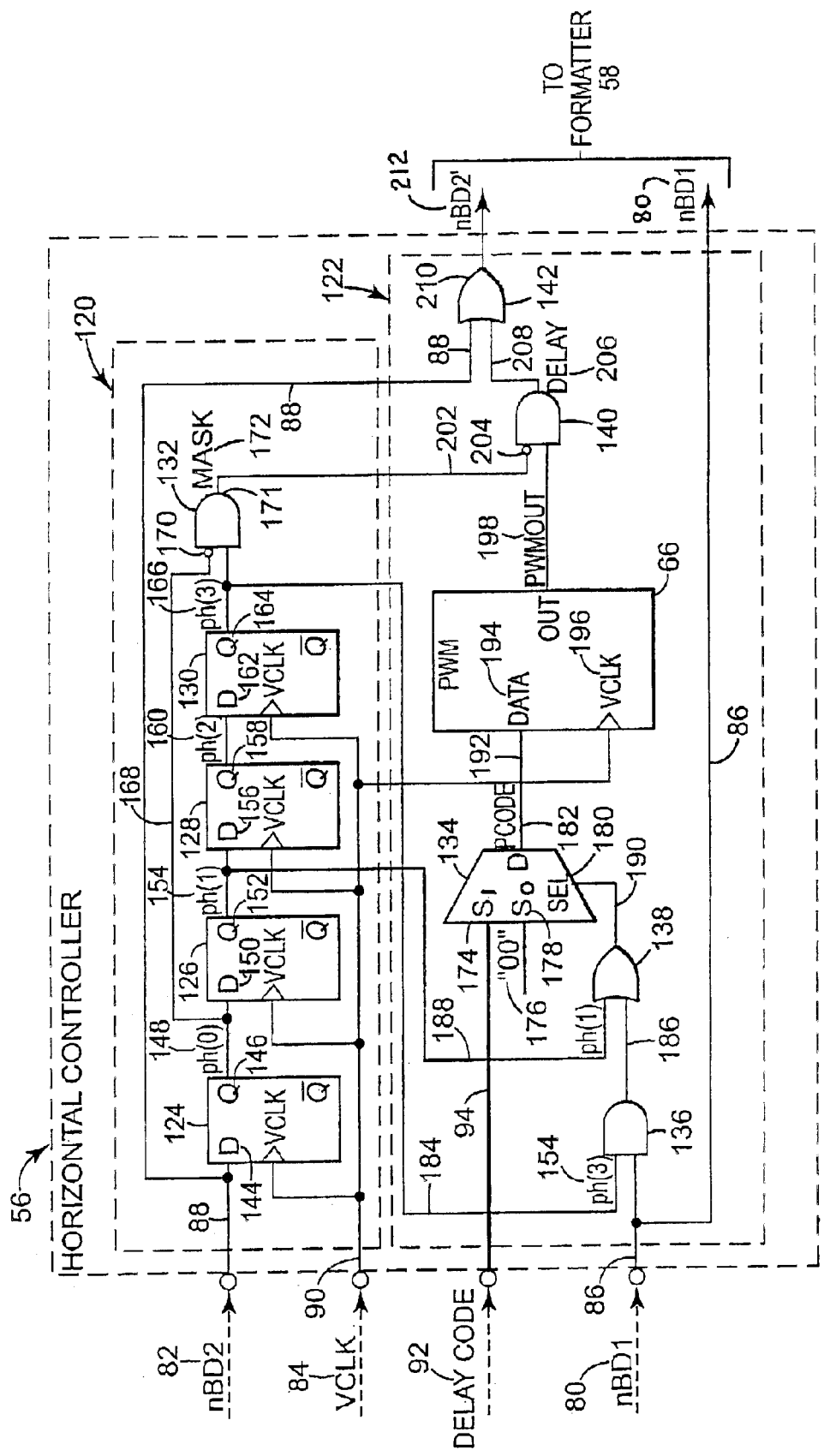
FIG. 3 is a block diagram of an exemplary embodiment of a horizontal controller.

FIG. 3 is a block diagram illustrating one exemplary embodiment of horizontal controller 56. Horizontal controller 56 includes a masking block 120 and a delay circuit 122. Masking circuit 120 includes a first, second, third, and fourth flip-flop 124, 126, 128 and 130, respectively, and an AND-gate 132. Delay block 122 includes PWM 66, a multiplexer 134, a first AND-gate 136, a first OR-gate 138, a second AND-gate 140, and a second OR-gate 142.

Each of the flip-flops 124, 126, 128, and 130 receives video clock VCLK 84 via path 90. First flip-flop 124 receives at a first cycle of VCLK 84 at a data input 144 second beam detect signal nBD2 82 at a first value, and provides at a subsequent cycle at an output 146 nBD2 at the first value. The output of first flip-flop 124 at 146 is labeled as PH(0), as indicated at 148. Second flip-flop 124 receives at a first cycle of VCLK 84 at a data input 150 output PH(0) 148 of first flip-flop 124 at a first value, and provides at a subsequent cycle at an output 152 PH(0) 148 at the first value. The output of second flip-flop 126 at 152 is labeled as PH(1), as indicated at 154. Third flip-flop 128 receives at a first cycle of VCLK 84 at a data input 156 output PH(1) 154 of second flip-flop 126 at a first value, and provides at a subsequent cycle at an output 158 PH(1) 154 at the first value. The output of third flip-flop 128 at 158 is labeled as PH(2), as indicated at 160. Fourth flip-flop 130 receives at a first cycle of VCLK 84 at a data input 162 output PH(2) 160 of third flip-flop 128 at a first value, and provides at a subsequent cycle at an output 164 PH(2) 160 at the first value. The output of third flip-flop 130 at 164 is labeled as PH(3), as indicated at 166.

AND-gate 132 receives output PH(3) 166 of third flip-flop 130 at a first input, and receives output PH(0) 148 of first flip-flop 124 via a path 168 at a second input. Output PH(0) 148 of first flip-flop 124 is inverted, as indicated at 170, prior to being received by AND-gate 132. AND-gate 132 provides at an output 171 a masking signal 172.

Multiplexer 134 receives delay code 92 via path 94 at a first input S1 174, receives a zero delay code "00" 176 at a second input S0 178, and receives a selector signal at a selector input SEL 180. Multiplexer 134 provides a pulse code (PCODE) 182 comprising delay code 92 when first input S1 174 is selected and zero delay code "00" 176 when second input S0 178 is selected. AND-gate 136 receives first beam detect signal nBD1 80 at a first input, and output signal PH(3) 154 of fourth flip-flop 130 at a second input via a path 184. OR-gate 138 receives an output of AND-gate 136 via a path 186 at a first input, receives output signal PH(1) 154 of second flip-flop 126 via a path 188 at a second input, and provides an output via a path 190 to selector input SEL 180 of multiplexer 134.

PWM 66 receives PCODE 182 from multiplexer 134 via a data path 192 at data input 194, and receives video clock VCLK 84 at clock input 196. PWM 66 provides an output signal (PWMOUT) 198 comprising a series of output pulses when PCODE 182 comprises delay code 92, with each pulse having a duration substantially equal to a desired time delay required to be added to second beam detect signal nBD2 82 so that first and second scan lines 70 and 74 horizontally align with one another. PWM 66 provides a substantially zero output at 198 when PCODE 182 comprises zero delay code "00" 176.

AND-gate 140 receives the output of PWM 66 via a path 200 at a first input, and receives masking signal 172 from AND-gate 132 via a path 202 at a second input. Masking signal 172 of AND-gate 132 is inverted, as indicated at 204, prior to being received by AND-gate 140. AND-gate 140 provides at an output gate 206 a delay signal 208. OR-gate receives delay signal 206 via a path 208 at a first input, and receives second beam detect signal nBD2 80 via path 88 at a second input. OR-gate 142 performs an or'ing operation to essentially add delay signal 206 to nBD2 82 to provide at an output 210 adjusted second beam detect signal nBD2' 212. First beam detect signal nBD1 80 and adjusted second beam detect signal nBD2' 212 are provided to a printer formatter, such as formatter 58 of dual-beam laser printer 50.

Figure 4:
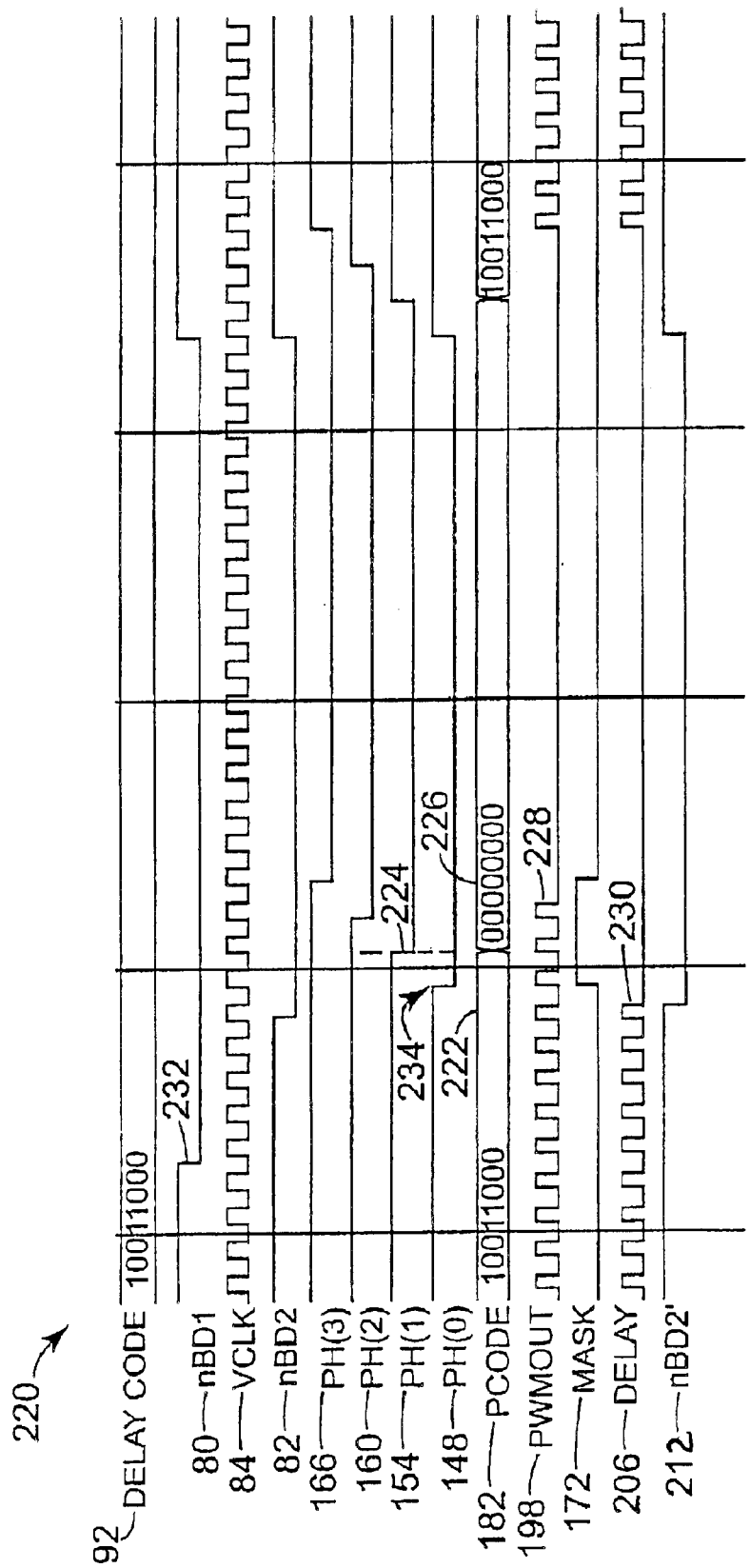
FIG. 4 is an example timing diagram illustrating the relationships between inputs and outputs of a horizontal controller.

FIG. 4 is an example timing diagram 220 illustrating the operation of horizontal controller 56 of FIG. 3. In the illustrative example, horizontal controller receives first beam detect signal nBD1 80, second beam detect signal nBD2 82, video clock signal VCLK 84, and delay code 92. First flip-flop 124 receives second beam detect signal nBD2 82 and holds the value of nBD2 82 at a "high" level for an extra cycle of VCLK 84 after which nBD2 82 has dropped to a "low" level as represented by output signal PH(0) 148. Each additional flip-flop 126, 128, and 130 holds the value of nBD2 at a "high" level for an additional clock cycle after nBD2 82 has dropped to a "low" level as indicated by output signals PH(1) 154, PH(2) 160, and PH(3) 166.

Multiplexer 134 provides delay code 92 from first input S1 174 as PCODE 182 as indicated at 222, until output signal PH(1) 154 falls from a "high" level to a "low" level as indicated at 224, at which point multiplexer 134 provides zero delay code "00" 176 from second input S0 178 as PCODE 182, as indicated at 226. PWM 66 receives PCODE 182 and provides PWMOUT 198. Notably, due to interior processing delays of PWM 66, PWM 66 continues to provide output pulses based upon delay code 92 for two cycles of VCLK 84 after which multiplexer 134 has begun to provide zero delay code "00" 176 at data input 194, as indicated at 228.

AND-gate 132 receives output signal PH(3) 166 from fourth flip-flop 130 at a first input, receives the inverse of output signal PH(0) 148 at a second output, and provides masking signal 172. Masking signal 172 functions to cancel out, or mask, the output pulse provided by PWM 66 after zero delay code "00" 176 has begun to be provided at data input 194, as indicated at 228. AND-gate 140 receives PWMOUT 198 from PWM 66 at a first input, receives the inverse of masking signal 172 at a second input, and provides delay signal 206.

OR-gate 142 receives delay signal 206 at a first input, receives second beam detect signal nBD2 82 at a second input, and provides adjusted second beam detect signal nBD2' 212. The or'ing operation performed by OR-gate 142 adds one coded pulse 230 to second beam detect signal nBD2 82 after the point at which nBD2 82 has gone from a "high" level to a low level to thereby provide adjusted second beam detect signal nBD2' 212.

First flip-flop 124 functions primarily to synchronize a falling edge 232 of second beam detect signal nBD2 82 with video clock VCLK 84. Second flip-flop 126 functions in tandem with first flip-flop 124 to lessen the occurrence of metastability problems that may arise if the falling edge 232 of second beam detect signal nBD2 82 occurs too close to a sampling window of first flip-flop 124. Second and third flip-flops 128 and 130 function primarily to extend the falling edge 232 of nBD2 82 to thereby provide signal PH(3) 166 which masks the "unwanted" pulses provided by PWM 66 after a falling edge 234 of PH(1) 154 has occurred.

Figure 5:
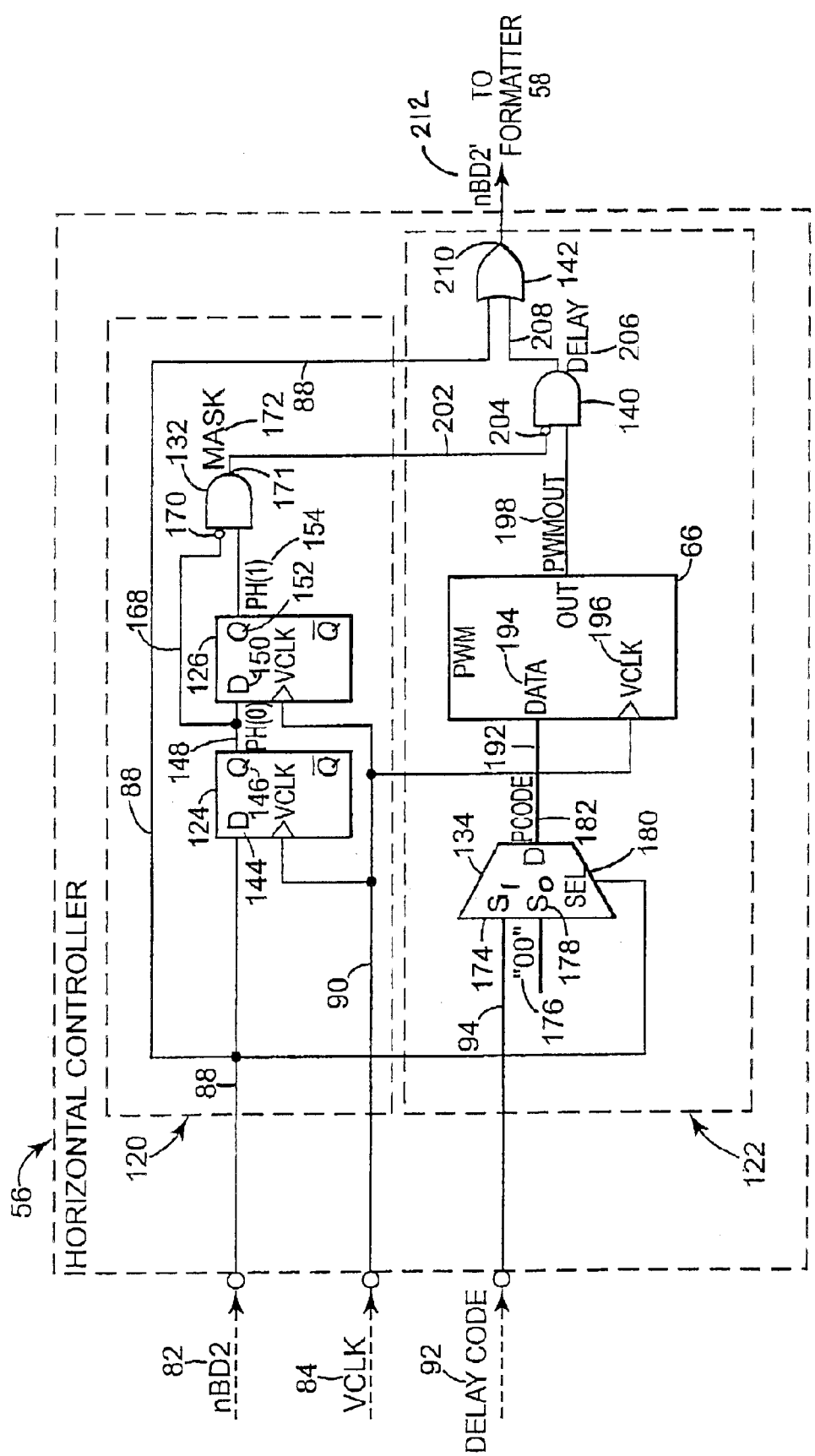
FIG. 5 is a block diagram of an exemplary embodiment of a horizontal controller.

FIG. 5 is a block diagram illustrating an example alternate embodiment of horizontal controller 56. As described previously above, first and second flip-flops 124 and 126 primarily function to synchronize the falling edge 232 of nBD2 82 with video clock VCLK 84. However, if beam detect circuit 52 (FIG. 1) provides second beam detect signal nBD2 82 such that it's falling edge 232 is already synchronized with VCLK 84, first and second flip-flops 124 and 126, along with AND-gate 136 and OR-gate 138 can be eliminated from the circuitry of horizontal controller 56. FIG. 5 is a block diagram illustrating an embodiment of horizontal controller 56 wherein second beam detect signal nBD2 82 is synchronized with VCLK 84 from beam detect circuit 52.

In the example alternate embodiment, horizontal controller includes masking block 120 and delay block 122. Masking circuit 120 includes first flip-flop 124, second flip-flop 126, and AND-gate 132. Delay block 122 includes PWM 66, multiplexer 134, AND-gate 140, and OR-gate 142.

First flip-flop 124 receives second beam detect signal nBD2 82 at data input 144 via path 88, and provides at output 146 output signal PH(0) 148. Second flip-flop 126 receives output signal PH(0) from first flip-flop 124 at data input 150, and provides at output 152 output signal PH(1) 154. AND-gate 132 receives PH(1) 154 at a first input, receives the inverse of signal PH(0) 148 at a second input, and provides at output 171 masking signal 172. Signal Ph(0) 148 is inverted prior to being received by AND-gate 132, as indicated at 170.

Multiplexer 134 receives at first input S1 174 delay code 92 via path 94, receives zero delay code "00" 176 at second input S0 178, and receives second beam detect signal nBD2 82 at selector input SEL 180. Multiplexer 134 provides pulse code (PCODE) 182 comprising delay code 92 when first input S1 174 is selected and zero delay code "00" when second input S0 178 is selected. PWM receives PCODE 182 at data input 194 and receives VCLK 84 at clock input 196. PWM 66 provides output signal (PWMOUT) 198 comprising a series of coded pulses when first input S1 174 is selected, and provides a substantially zero output when second input S0 178 is selected.

AND-gate 140 receives PWMOUT 198 at a first input, receives the inverse of masking signal 172 at a second input, and provides delay signal 206. Masking signal 172 is inverted prior to being received by AND-gate 140 as indicated at 204. OR-gate 142 receives delay signal 206 via path 208 at a first input and receives second beam detect signal nBD2 82 via path 88 at a second input. OR-gate 142 combines delay signal 208 with nBD2 82 to provide adjusted second beam detect signal nBD2' 212 at output 210. Although a timing diagram is not provided, the example alternative embodiment of horizontal controller 56 of FIG. 5 operates in a fashion similar to that illustrated by the example timing diagram of FIG. 4.

Horizontal controller 56 provides a dynamic means for substantially horizontally aligning multiple scan lines provided by multiple-beam laser scanning devices, and in particular those scan lines provided by dual-beam laser printers. By choosing a scan line provided by a first laser as a base scan line and inserting delays into beam detect signals for the remaining lasers through use of pulse width modulators and associated delay codes, an adjustment to the starting points of the scan lines provided by the remaining lasers is made so that they substantially align horizontally with the base scan line. By using pulse width modulators, the starting points of the scan lines can be dynamically adjusted by up to one pixel width for each set of scan lines if necessary. This characteristic allows for continued adjustment of scan line starting points after manufacture of the scanning device.

What is claimed is:

1. A laser imaging device comprising:
   a first laser to provide a first scan line having a first starting point;
   a second laser to provide a second scan line having a second starting point based on an adjusted beam detect signal; and
   a controller including a pulse width modulator configured to generate at least one output pulse using a delay code, the controller configured to generate the adjusted beam detect signal by combining the at least one output pulse and a beam detect signal associated with the second laser so that a state change of the adjusted beam detect signal is shifted in time from a state change of the beam detect signal by the at least one output pulse to substantially horizontally align the second starting point with the first starting point.

2. The laser imaging device of claim 1, wherein the first and second scan lines each comprise a plurality of pixels with each pixel having a width, and the controller is configured to add a delay of up to one pixel width to the beam detect signal associated with the second laser to generate the adjusted beam detect signal to thereby horizontally shift the second starting point by up to one pixel width.

3. A laser imaging device comprising:
   a first laser to provide a first scan line having a first starting point;
   a second laser to provide a second scan line having a second starting point based on an adjusted beam detect signal; and
   a controller configured to generate the adjusted beam detect signal using a delay code and a beam detect signal associated with the second laser to substantially horizontally align the second starting point with the first starting point, and wherein the controller includes a pulse width modulator configured to generate at least one output pulse using the delay code and configured to generate the adjusted beam detect signal by combining the at least one output pulse and the beam detect signal so that an adjusted beam detect state change is shifted in time from a beam detect state change by the at least one output pulse and further wherein the delay code is determined from a horizontal offset, defined as a distance between the first starting point and a third starting point of the second laser based upon the beam detect state change, such that a duration of the at least one pulse provided by the pulse width modulator corresponds to the horizontal offset between the third starting point and the first starting point.

4. The laser imaging device of claim 3, wherein the horizontal offset and the delay are determined at manufacture.

5. The laser imaging device of claim 3, wherein the delay code is stored in a memory.

6. The laser imaging device of claim 3, wherein a horizontal offset is measured and converted to a delay code after each time the laser imaging device scans a pair of first and second scan lines.

7. The laser imaging device of claim 3, wherein the delay code can be software over-written.

8. A laser imaging device comprising:
   a first laser to provide a first scan line having a first staffing point;
   a second laser to provide a second scan line having a second starting point based on an adjusted beam detect signal; and
   a controller configured to generate the adjusted beam detect signal using a delay code and a beam detect signal associated with the second laser to substantially horizontally align the second starting point with the first starting point, wherein
   a masking block configured to receive the beam detect signal and to provide a masking signal that is a function of the beam detect signal; and
   a delay block, including a pulse width modulator configured to receive the delay code and to provide a PWM output signal comprising a series of output pulses including an at least one output pulse, configured to combine the masking signal with the series of output pulses to thereby mask out unnecessary output pulses and provide a delay signal comprising only the at least one output pulse, and configured to combine the delay signal with the beam detect signal to thereby delay the time at which the state change occurs.

9. The laser imaging device of claim 8, wherein the masking block comprises:
   a first flip-flop configured to receive a video clock signal and the beam detect signal, wherein the beam detect signal state change is synchronous with the video clock signal, and configured to provide at a non-inverting output a first output signal;
   a second flip-flop configured to receive the video clock signal and the first output signal, and configured to provide at a non-inverting terminal a second output signal; and
   an AND-gate receiving at a first input an inverted first output signal and receiving at a second input the second output signal, and providing a masking signal.

10. The laser imaging device of claim 9, wherein the delay block comprises:
    a multiplexer receiving the delay code at a first input, receiving a zero delay code at a second input, receiving the beam detect signal at a selector input, and configured to select between the first and second inputs to thereby provide a pulse code;
    the pulse width modulator configured to receive the video clock signal and to receive the pulse code, and configured to provide the PWM output signal;
    an AND-gate configured to receive an inverted masking signal at a first input, to receive the PWM output signal at a second input; and to provide the delay signal; and
    an OR-gate configured to receive the beam detect signal at a first input, to receive the delay signal at a second input, and configured to provide an adjusted beam detect signal wherein the adjusted beam detect signal substantially comprises the beam detect signal having the state change delayed by the duration of the at least one output pulse.

11. The laser imaging device of claim 8, wherein the masking block comprises:
    a first flip-flop configured to receive a video clock signal and the beam detect signal, wherein the beam detect signal state change is asynchronous with the video clock signal, and configured to provide at a non-inverting output a first output signal;
    a second flip-flop configured to receive the video clock signal and the first output signal, and configured to provide at a non-inverting terminal a second output signal;
    a third flip-flop configured to receive the video clock signal and the second output signal, and configured to provide at a non-inverting terminal a third output signal;
    a fourth flip-flop configured to receive the video clock signal and the third output signal, and configured to provide at a non-inverting terminal a fourth output signal; and
    an AND-gate configured to receive at a first input an inverted first output signal, to receive at a second input the fourth output signal, and to provide the masking signal.

12. The laser imaging device of claim 11, wherein the delay block comprises:
a multiplexer configured to receive the delay code at a first input, to receive a zero delay code at a second input, receiving a selector signal at a selector input, and configured to select between the first and second inputs to thereby provide a pulse code;
a first AND-gate configured to receive a second beam detect signal having a state change occurring at a time on which the first scan line starting point is base, to receive the third output the third flip-flop at a second input, and having an output;
a first OR-gate having a first input coupled to the output of the first AND-gate, configured to receive the first output from the first flip-flop at a second input, and configured to provide the selector signal;
the pulse width modulator configured to receive the video clock signal and to receive the pulse code, and configured to provide the PWM output signal;
a second AND-gate configured to receive an inverted masking signal at a first input, to receive the PWM output signal at a second input; and to provide the delay signal; and
a second OR-gate configured to receive the beam detect signal at a first input, to receive the delay signal at a second input, and configured to provide an adjusted beam detect signal wherein the adjusted beam detect signal substantially comprises the beam detect signal having the state change delayed by the duration of the at least one output pulse.

13. A controller for use with a dual beam laser imaging device to provide a first scan line having a first starting point, and a second scan line having a second starting point based on an adjusted beam detect signal, the controller comprising:
a pulse width modulator configured to generate at least one output pulse having a duration based on a delay code, controller configured to combine a beam detect signal associated with the second scan line with the at least one output pulse to generate the adjusted beam detect signal to substantially horizontally align the second starting point with the first starting point.

14. The controller of claim 13, wherein the first and second scan lines each comprise a plurality of pixels with each pixel having a width, and the controller is configured to add a delay of up to one pixel width to the second beam detect signal to thereby horizontally shift the second starting point by up to one pixel width.

15. A controller for use with a dual beam laser imaging device to provide a first scan line having a first starting point, and a second scan line having a second starting point based on an adjusted beam detect sianal, the controller comprising:
a pulse width modulator configured to generate at least one output nulse using a delay code, with the ournut nulse having a duration, and with the pulse width modulator configured to combine a beam detect signal with the at least one output pulse to generate the adjusted beam detect signal to substantially horizontally align the second starting point with the first starting point, wherein a horizontal offset between the first and second starting points is measured and converted to the delay code such that the duration of the at least one pulse provided by the PWM in response to receiving the delay code horizontally shifts the second starting point by the horizontal offset.

16. The controller of claim 15, wherein the horizontal offset is measured and converted to the delay code at manufacture.

17. The controller of claim 15, wherein the delay code is stored in a memory.

18. The controller of claim 15, wherein a horizontal offset is measured and converted to a delay code after each time the dual-beam laser imaging devices scans a pair of first and second scan lines.

19. The controller of claim 15, wherein the delay code can be software over-written.

20. A controller for use with a dual beam laser imaging device to provide a first scan line having a first starting point, and a second scan line having a second starting point based on an adjusted beam detect signal, the controller comprising:
a pulse width modulator configured to generate at least one output pulse using a delay code, with the output pulse having a duration, and with the pulse width modulator configured to combine a beam detect signal with the at least one output pulse to generate the adjusted beam detect signal to substantially horizontally align the second starting point with the first starting point, wherein
a masking block configured to receive the second beam detect signal and to provide a masking signal that is a function of the second beam detect signal; and
a delay block, including the pulse width modulator configured to receive the delay code and to provide a PWM output signal comprising a series of output pulses including the at least one output pulse, configured to combine the masking signal with the series of output pulses to thereby mask out unnecessary output pulses and provide a delay signal comprising only the at least one output pulse, and configured to combine the delay signal with the second beam detect signal to thereby delay the time at which the state change occurs.

21. The controller of claim 20, wherein the masking block comprises:
a first flip-flop configured to receive a video clock signal and the beam detect signal, wherein the beam detect signal state change is synchronous with the video clock signal, and configured to provide at a non-inverting output a first output signal;
a second flip-flop configured to receive the video clock signal and the first output signal, and configured to provide at a non-inverting terminal a second output signal; and
an AND-gate receiving at a first input an inverted first output signal and receiving at a second input the second output signal, and providing a masking signal.

22. The controller of claim 21, wherein the delay block comprises:
a multiplexer receiving the delay code at a first input, receiving a zero delay code at a second input, receiving the beam detect signal at a selector input, and configured to select between the first and second inputs to thereby provide a pulse code;
the pulse width modulator configured to receive the video clock signal and to receive the pulse code, and configured to provide the PWM output signal;
an AND-gate configured to receive an inverted masking signal at a first input, to receive the PWM output signal at a second input; and to provide the delay signal; and
an OR-gate configured to receive the beam detect signal at a first input, to receive the delay signal at a second input, and configured to provide an adjusted beam detect signal wherein the adjusted beam detect signal substantially comprises the beam detect signal having the state change delayed by the duration of the at least one output pulse.

23. The controller of claim 20, wherein the masking block comprises:
- a first flip-flop configured to receive a video clock signal and the beam detect signal, wherein the beam detect signal state change is asynchronous with the video clock signal, and configured to provide at a non-inverting output a first output signal;
- a second flip-flop configured to receive the video clock signal and the first output signal, and configured to provide at a non-inverting terminal a second output signal;
- a third flip-flop configured to receive the video clock signal and the second output signal, and configured to provide at a non-inverting terminal a third output signal;
- a fourth flip-flop configured to receive the video clock signal and the third output signal, and configured to provide at a non-inverting terminal a fourth output signal; and
- an AND-gate configured to receive at a first input an inverted first output signal, to receive at a second input the fourth output signal, and to provide the masking signal.

24. The controller of claim 23, wherein the delay block comprises:
- a multiplexer configured to receive the delay code at a first input, to receive a zero delay code at a second input, receiving a selector signal at a selector input, and configured to select between the first and second inputs to thereby provide a pulse code;
- a first AND-gate configured to receive a second beam detect signal having a state change occurring at a time on which the first scan line starting point is base, to receive the third output the third flip-flop at a second input, and having an output;
- a first OR-gate having a first input coupled to the output of the first AND-gate, configured to receive the first output from the first flip-flop at a second input, and configured to provide the selector signal;
- the pulse width modulator configured to receive the video clock signal and to receive the pulse code, and configured to provide the PWM output signal;
- a second AND-gate configured to receive an inverted masking signal at a first input, to receive the PWM output signal at a second input; and to provide the delay signal; and
- a second OR-gate configured to receive the beam detect signal at a first input, to receive the delay signal at a second input, and configured to provide an adjusted beam detect signal wherein the adjusted beam detect signal substantially comprises the beam detect signal having the state change delayed by the duration of the at least one output pulse.

25. A method for adjusting a scan line starting point in a laser imaging device, the method comprising:
- producing with a laser a scan line having a starting point based on a beam detect signal having a state change occurring at a time;
- providing a delay code to a pulse width modulator to provide at least one output pulse having a duration; and
- combining the beam detect signal with the at least one output pulse to delay the time at which the state change occurs.

26. A method for aligning a second scan line starting point with a first scan line starting point in a dual-beam laser imaging device, the method comprising:
- producing with a first laser a first scan line having the first starting point;
- producing with a second laser a second scan line vertically offset from the first scan line and having the second starting point horizontally offset from the first starting, the second starting point based on a beam detect signal having a state change;
- providing a delay code to a pulse width modulator to provide at least one output pulse having a duration; and
- combining the beam detect signal with the at least one output pulse to delay the time at which the state change occurs to thereby horizontally shift the second starting point by the horizontal offset so that the second starting point substantially aligns horizontally with the first starting point.

27. The method of claim 26, further comprising:
- measuring the horizontal offset between the first and second scan line starting points at manufacture; and
- converting the horizontal offset to the delay code.

28. The method of claim 27, further comprising:
- storing the delay code in a memory.

29. The method of claim 26, further comprising:
- measuring a horizontal offset between the first and second scan line after each time the dual-beam lasing imaging device scans a pair of first and second scan lines; and
- converting the measured horizontal offset to a delay code to thereby dynamically horizontally adjust the second scan line starting point.

30. A horizontal controller for use with a laser imaging device providing a scan line having a starting point based upon a beam detect signal having a state change occurring at a time, the horizontal controller comprising:
- a pulse width modulator configured to receive a delay code and to provide at least one output pulse having a duration based on the delay code; and
- a combiner configured to combine the beam detect signal with the at least one output pulse to delay the time at which the state change occurs to horizontally shift the scan line starting point.

31. A method of adjusting a scan line in a laser imaging device, the method comprising:
- generating a non-adjusted beam detect signal having a state change;
- generating a delay signal based on a delay code;
- generating an adjusted beam detect signal by combining the non-adjusted beam detect signal with the delay signal such that a state change of the adjusted beam detect signal is shifted from the state change of the non-adjusted beam detect signal by the delay signal; and
- forming a scan line having a starting point based on the state change of the adjusted beam detect signal.

32. The method of claim 31, further comprising:
- providing a scan line comprising a plurality of pixels with each pixel having a width; and
- generating the adjusted beam detect signal by using the delay code to shift the state change of the non-adjusted beam detect signal such that the scan line starting point based on the adjusted beam detect signal is shifted by up to one pixel width from a starting point based on the non-adjusted beam detect signal state change.

33. The method of claim 32, further comprising:

providing a master scan line having a master starting point;

determining the delay code from an offset distance, defined as a distance between the master starting point and the scan line starting point based on the non-adjusted beam detect signal state change, such that the delay code shifts the state change of the non-adjusted beam detect signal by a duration producing a shift in the scan line starting point based on the adjusted beam detect signal substantially equal to the offset distance.

34. A laser imaging device comprising:

a first laser to provide a first scan line having a first starting point;

a second laser to provide a second scan line having a second starting point based on an adjusted beam detect signal;

means for generating a delay signal using a delay code; and means for generating the adjusted beam detect signal by combining the delay signal with a beam detect signal associated with the second laser to substantially horizontally align the second starting point with the first starting point.

35. The laser imaging device of claim 34, wherein the first and second scan lines each comprise a plurality of pixels with each pixel having a width, and the means for generating is configured to add a delay of up to one pixel width to the beam detect signal associated with the second laser to generate the adjusted beam detect signal to thereby horizontally shift the second starting point by up to one pixel width.

36. The laser imaging device of claim 34, wherein the means for generating the delay signal includes a pulse width modulator configured to generate at least one output pulse using the delay code and the means for generating the adjusted beam detect signal comprises combining the at least one output pulse and the beam detect signal so that an adjusted beam detect state change is shifted in time from a beam detect state change by the at least one output pulse.

37. A laser imaging device comprising:

a first laser to provide a first scan line having a first starting point;

a second laser to provide a second scan line having a second starting point based on an adjusted beam detect signal; and means for generating the adjusted beam detect signal using a delay code and a beam detect signal associated with the second laser to substantially horizontally align the second starting point with the first starting point, wherein the means for generating includes a pulse width modulator configured to generate at least one output pulse using the delay code and configured to generate the adjusted beam detect signal by combining the at least one output pulse and the beam detect signal so that an adjusted beam detect state change is shifted in time from a beam detect state change by the at least one output pulse, and further wherein the delay code is determined from a horizontal offset, defined as a distance between the first starting point and a third starting point of the second laser based upon the beam detect state change, such that a duration of the at least one pulse provided by the pulse width modulator corresponds to the horizontal offset between the third starting point and the first starting point.

* * * * *